UNITED STATES PATENT OFFICE.

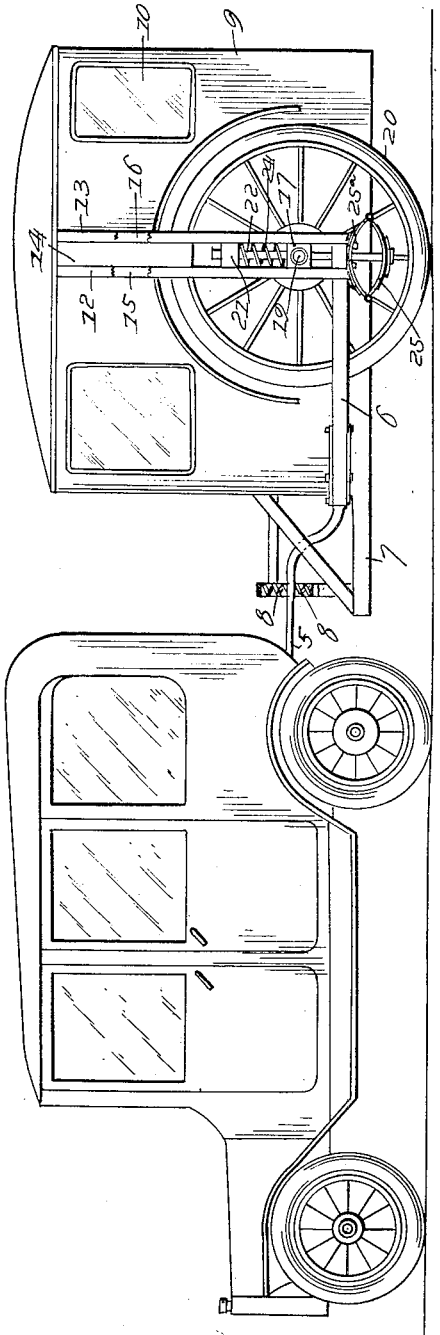

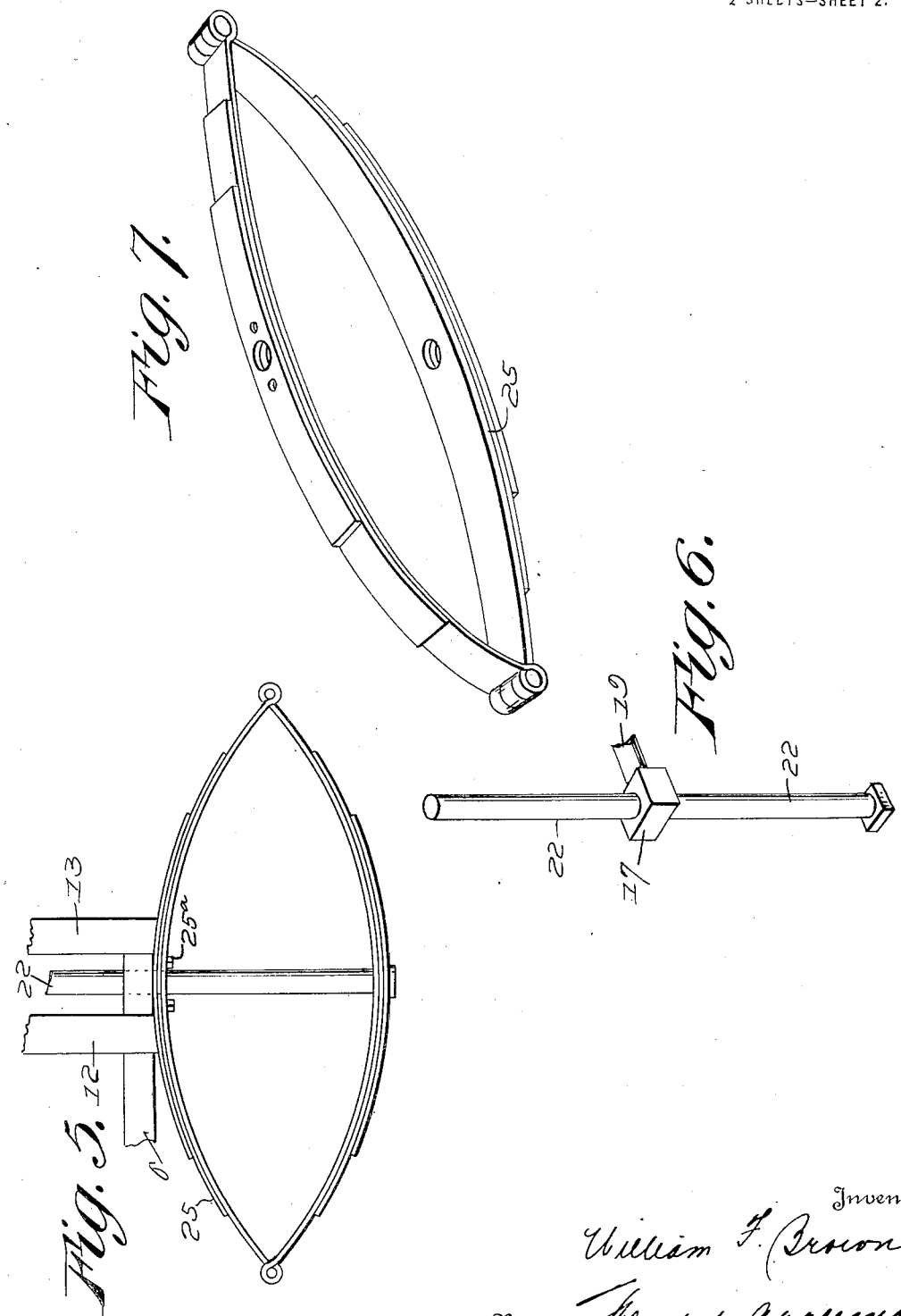

WILLIAM F. BROWN, OF SAN ANTONIO, TEXAS.

TRAILER FOR LAND VEHICLES.

1,404,575.

Specification of Letters Patent.  Patented Jan. 24, 1922.

Application filed May 14, 1921. Serial No. 469,550.

*To all whom it may concern.*

Be it known that I, WILLIAM F. BROWN, a citizen of the United States of America, and resident of San Antonio, in the county of Bexar and State of Texas, have invented certain new and useful Improvements in Trailers for Land Vehicles, of which the following is a specification.

This invention relates to land vehicles and particularly to a trailer for attachments to automobiles or the like, the said invention having for its object the provision of a novel trailer having a suspension which will prove effective to absorb shock and vibration due to the running of the wheels on the road bed; the said invention furthermore providing means whereby a body of a trailer may be suspended at its sides without the interposition of an axle extending from one wheel to the other, which axle would, if present, interfere with the capacity of the body which might be supplied with a chassis.

It is an object of this invention to produce a trailer of the character indicated having relatively high wheels, with means for yieldingly suspending the body therebetween, the said construction being such that the body can be hung lower than is possible with vehicles now in common use, in order that it may extend well down to any road clearance desired, a condition which will result in the production of a body readily accessible by passengers, or which may be readily loaded or unloaded when freight is to be applied to or removed from it.

A still further object of this invention is to provide springs which will yieldingly support the body, the said springs being of a nature as to withstand shocks and strains incident to its use without liability of their being damaged under ordinary conditions of use.

A still further object of this invention is to produce a trailer of the character indicated which will prove strong and durable as well as satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of an automobile, showing a trailer connected thereto;

Figure 2 illustrates a rear elevation of the trailer;

Figure 3 illustrates a sectional view of a fragment between its ends;

Figure 4 illustrates a view in elevation of a wheel unit;

Figure 5 illustrates an enlarged detailed view showing one of the springs and its association with the frame;

Figure 6 illustrates a perspective view of a guiding rod and a fragment of an axle; and Figure 7 illustrates a perspective view of the spring.

In these drawings 5 indicates a tongue by which the frame 6 of the trailer may be connected to an automobile of any conventional type. The platform or frame structure 7 projects outwardly from the front of the trailer, and a compression spring 8 is interposed between the tongue and the frame, in order that the up-and-down movement of the front of the trailer with relation to the tongue may be cushioned.

The body 9 is shown as a closure having glazed openings 10, although the inventor does not wish to be limited with respect to the configuration or structural features of the trailer except as it deals with its suspension. The frame member 11, in the present embodiment of the invention, supports at each end, which corresponds to the sides of the trailer, parallel members 12 and 13 which form guides, and these elements 12 and 13 are attached to a filler 14 which is also attached to the frame member 11. Just back of the members 12 and 13 and in spaced relation thereto, are members 15 and 16 which are likewise suspended from the frame member 11.

The members 12, 13, 15 and 16 form what may be termed a "post" or "guiding element" in which heads 17 and 18 are slidable. The pairs of heads on each side of the trailer each form supports for an axle 19 with relation to which a wheel 20 is mounted in any appropriate way for rotation with respect to the axle, and the said wheel 20 is relatively high, as shown, a proportion which would facilitate the travel of the wheels over uneven surfaces or contours of the road bed.

An abutment in the nature of a block 21 is interposed between each pair of the guiding members 12 and 13, 15 and 16, and the heads 17 and 18 have guiding rods 22 and 23 projecting above and below them, and these rods are slidable in the abutments 21. A spring such as 24 is interposed between each abutment and sliding head, each said spring encircling a rod whereby the weight of the load is supported by the said springs, owing to the fact that the guiding members are rigidly connected to the frame structure of the body, and the springs, of course, would be supported by the heads which are connected to the axles of the wheels.

The rods 22 and 23 extend below the side frames 6 and each lower end is connected to the lower half of a spring 25, the upper half of each of said springs being connected to the side frames 6, in order that the said springs 25 may operate to prevent undue upward movement or rebound of the body while equalizing to some extent the action of the springs 24.

A supplemental support or what may be termed a "sub-axle" 26 acts as a support for the body, in that the lower edge of the body rests on the said sub-axle and this sub-axle has its ends connected to the innermost of the rods of each pair and the sub-axle rests on the top of the springs 25. This sub-axle has a drop, preferably, and the degree of this drop will be determined by the clearance to be afforded the trailer. As stated, this trailer may be used for carrying passengers, and the manner of its suspension is such that it will prove comfortable, due to the yielding action of the springs.

The suspenison is wholly exterior of the body and does not interfere with the capacity, nor does it interfere with symmetry of its contour.

The upper section of each spring 25 is anchored to the frame member 6 by fastenings such as bolts 25ª.

I claim:

1. In a trailer for land vehicles, a chassis frame, a body structure including a frame, guiding elements arranged in pairs on each side of the body and connected thereto, an abutment between each pair of the said guiding elements, traction wheels, axles therefor, pairs of heads to which each axle is connected, the said heads being slidable between the pairs of guiding members, guiding rods projecting above and below each head, the upwardly extending rods being slidable in the abutments, springs interposed between the abutments and the said heads, springs connected to each of the downwardly extending rods, and means for anchoring the springs to the chassis.

2. In a trailer for land vehicles, a chassis frame, a tongue connected thereto, means for cushioning the movement of the body with relation to the tongue, a body, pairs of guiding elements on each side of the body, a wheel having an axle on each side of the body, heads in which the ends of each axle are anchored, the said heads being slidable between the pairs of guiding members, abutments between each pair of guiding members, rods extending upwardly and downwardly from the heads, the said upwardly extending rods being guided in the abutments, springs interposed between the heads and the abutments, springs connected to the downwardly extending rods, and means for anchoring the said springs.

3. In a trailer for land vehicles, a chassis frame, a tongue connected thereto, means for cushioning the movement of the body with relation to the tongue, a body, pairs of guiding elements on each side of the body, a wheel having an axle on each side of the body, heads in which the ends of each axle are anchored, the said heads being slidable between the pairs of guiding members, abutments between each pair of guiding members, rods extending upwardly and downwardly from the heads, the said upwardly extending rods being guided in the abutments, springs interposed between the heads and the abutments, springs connected to the downwardly extending rods, means for anchoring the said springs, and a sub-axle for supporting the body, the said sub-axle having its ends connected to a downwardly extending rod at each side of the body.

WILLIAM F. BROWN.